Nov. 16, 1948.                P. E. MERCIER                2,453,721
                   CONTROL FLAP WITH FLUID JETS FOR AIRCRAFT
Filed Oct. 7, 1941                                    4 Sheets-Sheet 1
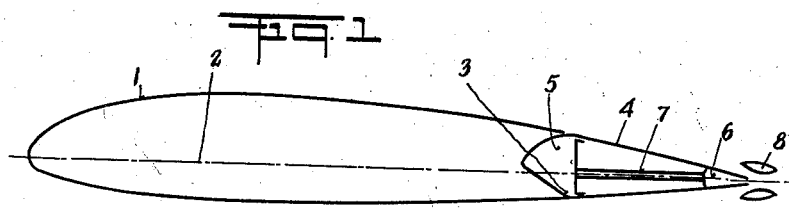
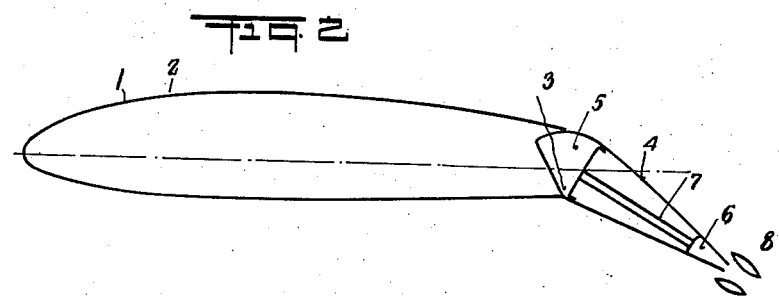
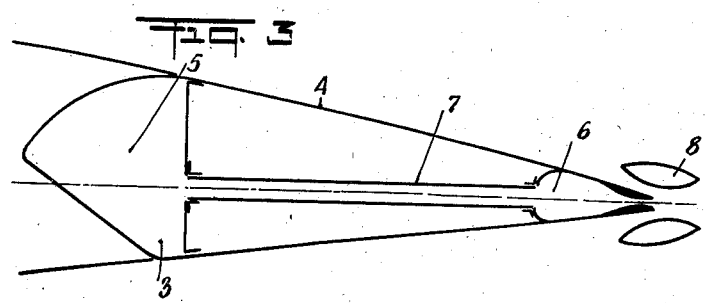
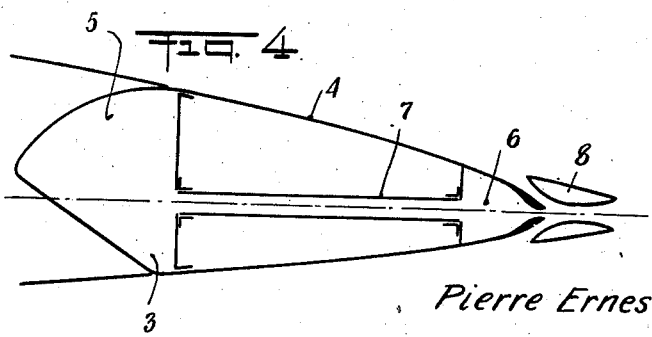
Pierre Ernest Mercier
INVENTOR.
BY Haseltine, Lake & Co.
ATTORNEYS Nov. 16, 1948.   P. E. MERCIER   2,453,721
CONTROL FLAP WITH FLUID JETS FOR AIRCRAFT
Filed Oct. 7, 1941   4 Sheets-Sheet 2
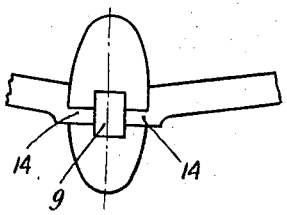
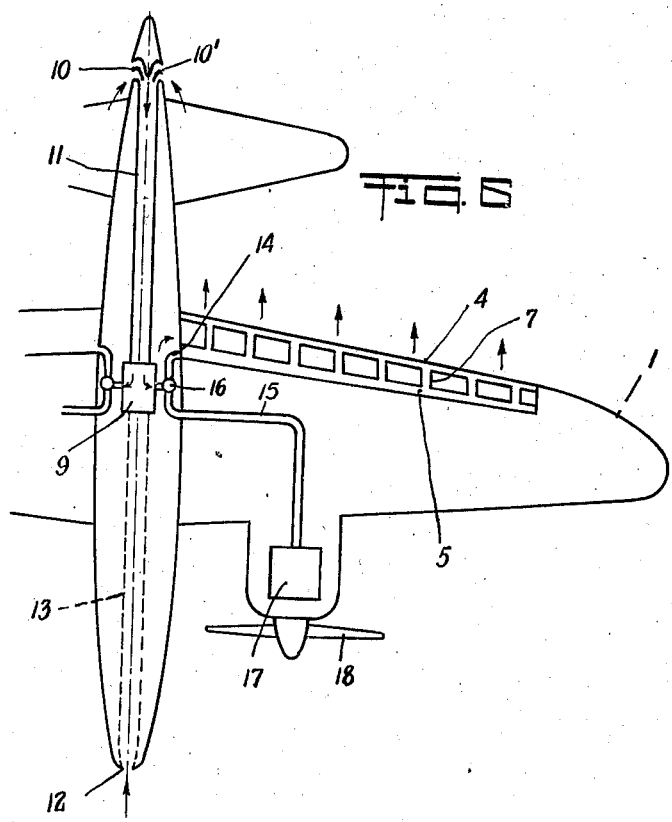
Pierre Ernest Mercier
INVENTOR.
BY Haseltine, Lake & Co.
ATTORNEYS

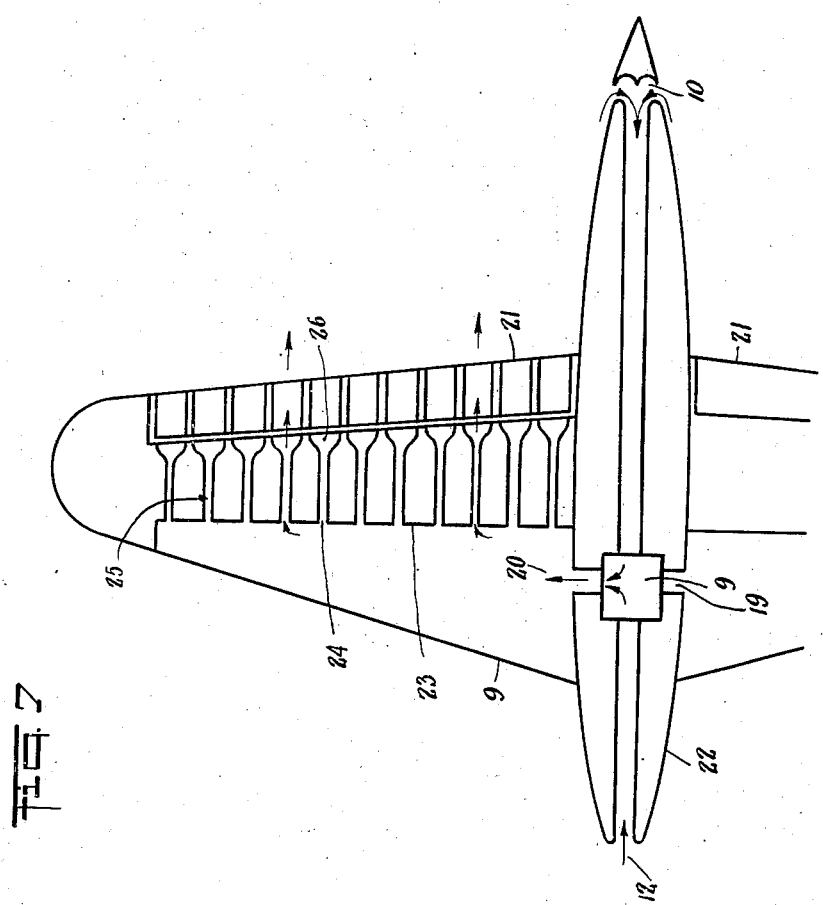

Nov. 16, 1948.   P. E. MERCIER   2,453,721
CONTROL FLAP WITH FLUID JETS FOR AIRCRAFT
Filed Oct. 7, 1941   4 Sheets-Sheet 4
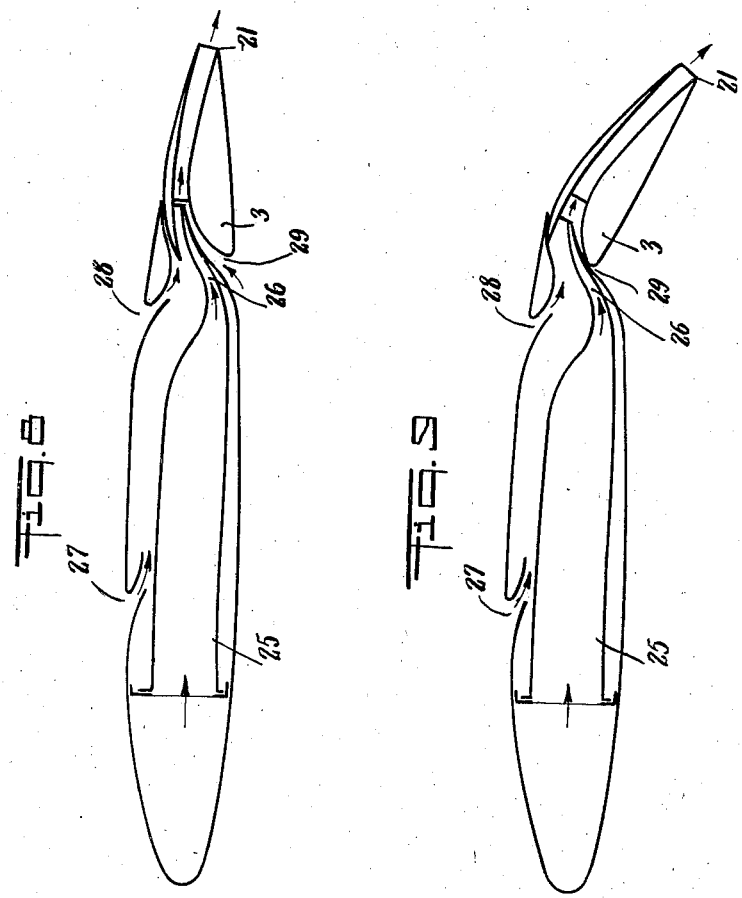
Pierre Ernest Mercier
INVENTOR.
BY Haseltine, Lake & Co.
ATTORNEYS Patented Nov. 16, 1948

2,453,721

UNITED STATES PATENT OFFICE 2,453,721

CONTROL FLAP WITH FLUID JETS FOR AIRCRAFT

Pierre Ernest Mercier, Westport, Conn.

Application October 7, 1941, Serial No. 413,942
In France November 22, 1940

8 Claims. (Cl. 244—15)

This invention relates to aircraft. It is a matter of common knowledge that the air in the "boundary layers" of the wings and other parts of an aircraft exerts a retarding effect by increasing the general drag. The possibility of sucking boundary air by slots or orifices in the wings and other parts has been suggested for the purpose of eliminating or at least diminishing the effect of the said boundary layers.

Use has also been made in aircraft of the propelling effect of air or other gases under pressure rearwardly ejected through nozzles to provide a propulsive force.

The present invention has for its principal object the provision of means for simultaneously performing both of these purposes.

The invention further has for an object the utilization of the external air admitted through slots or orifices for furnishing when compressed and ejected rearwardly through nozzles a force for propelling or assisting in propelling the aircraft.

The invention further has for an object the provision of means for taking air from the boundary layer and thereby providing a superlift for the aircraft, compressing said air and utilizing it for the propulsion of the aircraft.

The invention further has for an object the arrangement of slots and/or orifices and conduits connecting therewith to conduct external air to a motor driven compressor located in the fuselage, nacelle or hollow wing of an aircraft and means for conducting the compressed air to a plurality of propulsive nozzles located in the trailing edge and/or rear terminal point of the aircraft body.

The invention further has for an object the provision of propulsive nozzles in the trailing edge of a pivotal wing flap and means for delivering compressed air through said pivotal flap to said nozzles, the movement of the flap controlling the inflow of air through slots or orifices in the wing.

Other objects of the invention will appear from the following detailed description with reference to the accompanying drawings in which:

Figure 1 is a diagrammatic cross-sectional view of an airfoil having a pivotal flap with propulsive nozzles in its trailing edge, the flap being shown in raised or normal flying position.

Figure 2 is a similar view showing the flap moved about its pivot to the position usual during slow flight or while taking off or landing.

Figure 3 is a view on a larger scale of the flap portion of the airfoil in the same position as in Figure 1.

Figure 4 shows a slightly modified form.

Figure 5 is a detail view showing a wing, such as that shown in Figure 1, inserted in the fuselage of an airplane.

Figure 6 is a general diagrammatic plan view of an airplane, with a part of one of the wings broken away, showing the motor compressor and its connection to the propulsive nozzles in the trailing edge of the wing and the conduits for supplying air to said compressor.

Figure 7 is a diagram on an enlarged scale, with a portion of one of the wings broken away, showing another embodiment in plan of the propulsive nozzles in a pivotal flap in association with a compressor and duct arrangement facilitating control of the boundary layers of air passing along the fuselage.

Figure 8 is a diagrammatic sectional view of an airfoil showing the nozzles and pivotal flap of Figure 7 in elevation.

Figure 9 is a view similar to Figure 8 but showing the flap in lowered position.

The invention provides the combination of propulsive nozzles, fed by a heated fluid that is under pressure, with flying machine members such as nacelles and lifting wings in order to accelerate the boundary layer at the rear of the flying machine member relative to the direction of motion. The invention employs one or several nozzles of appropriate shape at the level of the trailing edge of a wing or of the terminal point of a streamlined body, supplied with air under pressure by means of a motor-driven compression member situated in the interior of the flying machine, in the hollow space of its wings or nacelles. The fluid sucked in by the motor-driven blower also contributes to the effect of drag reduction combined with the development of a propulsive force in the sense of the invention.

For this purpose the air taken in by the motor-driven compressor may be taken in by means of orifices arranged in the front of the streamlined body in the zone normally under dynamic over-pressure, or through holes or slots arranged at the rear of the nacelle or streamlined body, the air being led forwardly in the interior of said nacelle in which the motor-driven compressor is located.

When the air is admitted through an anterior orifice the flow due to the suction of the motor-driven compressor is equal to a reduction of the maximum section of the hull having the orifice in question. When on the other hand posterior suction holes are used the laminar flow along said hull is promoted, which reduces the amount of the frictional resistance of the air displaced relative to it.

Referring to Figure 1 an airfoil has on its chord 2 and at the level of the trailing edge a propulsive nozzle consisting of two longitudinal members 8 which form a jet, between which there opens a slot fed by a receiver or distributor 5 supplied with compressed air from a compressor (not shown) through suitable connections and connected to the slot 6 by a number of tubes such as 7.

The assembly formed by the receiver 5, the tube 7, the slot 6 and the members 8 is arranged to be movable as a whole around a hinge 3, which permits various adjustments of the assembly in question to be made relative to the chord 2. In Figure 2 the assembly in question is shown as deflected downwardly in which position it acts as the part of a curvature and hyperlift flap.

Figure 3 shows on a larger scale in principle the same embodiment. Figure 4 shows a modified form in which the members 8 are located substantially within the outline of the airfoil itself instead of being arranged on the outside of said outline.

In Figure 5 two pipe sections 14 are shown which establish communication between the receiver 5 and the motor-driven compressor 9; for this purpose the pipes 14 are offset downwardly so as to be concentric with the hinge 3 and to maintain communication between the compressor and the interior of the receiver 5 in all positions of the flap.

Referring to Figure 6 at 11 there is shown in solid lines a conduit for feeding the motor-driven compressor 9 with the air admitted at a point adjacent the rear end of the fuselage through openings 10 having vanes 10' disposed therein for guiding the air on its return movement toward the front inside the fuselage. At 13 a pipe is indicated in dotted lines which receives the air under pressure through the orifice 12 at the front point of the fuselage. It is clear that, without departing from the scope of the invention, the motor-driven compressor may be fed with air in either of these ways, or by combining the two, or by any other arrangement answering the same principle and introducing no perturbation in the flow of air along the surfaces of the fuselage or other exterior surfaces of the aeroplane. As shown in Figure 6 the motor-driven compressor 9 may feed, by means of the branch box 16, either the receiver 17, which may be of the turbine type and drives the propeller 18, or the receiver 5 and the slots 6.

At low speeds the nozzle of the trailing edge described in the present invention has above all the effect of increasing the lift drag ratio of the wing and its lift, propulsion being in that case insured preferably by propellers such as 18.

At high speeds it may be advantageous to use the whole power of the motor-driven compressor by applying it solely to the trailing edge nozzles, the propellers being feathered or retracted in any desired manner.

It is evident that the propellers may also be driven by ordinary engines independent of the motor compressors themselves, but this appears to be less advantageous considering the weight of the motor installations.

Referring now to Figures 7-9, Figure 7 represents a diagrammatic plan section through a wing and a fuselage. 21 denotes the trailing edge. 22 is the fuselage. Air intakes are shown at 12 in front of the fuselage and at 10 in the rear. They feed a compressor 9 located in the fuselage. The compressed fluid from the compressor 9 is distributed in the structure of the wing by means of two passages 19 and 20. Although the compressor is shown as housed in a fuselage, it will be understood that the same advantages and effect may be obtained by providing a nacelle with conduits and connections to the adjacent wing structure.

The partition or web 23 dividing the forward or air-receiving compartment of the wing from the rear portion is provided with orifices such as 24 discharging into tubes such as 25, arranged parallel to each other and extending in a direction approximately at right angles to the span of the wing. The tubes 25 are widened toward their rear extremity while presenting a curvature in a vertical plane, as shown in Figures 8 and 9. Figs. 8 and 9 are vertical sections on a larger scale than Fig. 7 through the span of the wing, in the case of normal flight, Figure 8, and in the case of flight at low speed, Figure 9. The rear part of the wing is movable in the manner of an ordinary superlift flap about the hinge 3. As shown this rear part or flap carries a portion of the widened tube constituting the propulsive nozzle. Through said nozzle which discharges at 21, following a truncation of the airfoil near the trailing edge, are evacuated the layers of turbulent air drawn in by the slots such as 27 and 28 on the top of the wing, or 29 on the bottom. As the superlift at low speed is related especially to the acceleration of the layers of air which pass on the top of the wing, when the movable rear flap of the wing section is deflected, as shown in Figure 9, the slot 29 is closed automatically. This increases suction at the level of the slots 27 and 28 situated on the upper side of the wing. Although two slots 27 and 28 are shown, it will be understood that more than two may be employed if desired, or that only one such slot may be provided. When one slot only is provided it is preferably located toward the rear edge of the wing as at 28.

What I claim and desire to protect by Letter's Patent of the United States is:

1. An airfoil having a pivoted rear flap and having a slot in its lower surface adjacent said flap, nozzles in the trailing edge of said flap and arranged to receive air from said slot, and means for supplying air under pressure to said nozzles, said flap being movable about its pivot to a position in which it closes said slot.

2. An airfoil having a pivoted rear flap, said airfoil having a slot in its upper surface and a second slot in its lower surface adjacent said flap, said second slot being closed by said flap when the flap is moved about its pivot to lowered position, nozzles in the trailing edge of said pivoted rear flap in communication with said slots through passages in the interior of said airfoil, and means for supplying a fluid under pressure to said nozzles, whereby flow of air along the surfaces of said airfoil into said slots and thence to said nozzles is promoted.

3. In an aircraft embodying an engine nacelle and a hollow wing having a pivoted rear flap, a plurality of propulsive nozzles in contiguous relation to one another along the trailing edge of said flap, an air compressor located in said nacelle, an intake conduit for leading air from slots in said nacelle adjacent the rear end thereof to said compressor, means for leading compressed air from said compressor and discharging it through said nozzles, and means adjacent said nozzles defining slots in communication with the lateral surfaces of said flap, whereby discharge of compressed air through said nozzles will accelerate flow of the boundary layers of air along the opposite surfaces of said flap and through said slots regardless of the position of said flap.

4. In combination with an airfoil having a pivoted flap at the trailing edge thereof, rearwardly directed propulsive nozzles carried by and movable with the pivoted flap, said nozzles being further disposed in contiguous relation to one another along the length of said flap, means for conducting a gas under pressure to said nozzles, and means carried by the pivoted flap and positioned adjacent said nozzles to direct a boundary layer of air from a surface of the airfoil to a point adjacent said nozzles, whereby flow of said boundary layer is accelerated by the action of gases being discharged through said nozzles in all positions of the pivoted flap.

5. In combination with an airfoil having a pivoted flap at the trailing edge thereof, rearwardly directed propulsive nozzles carried by and movable with the pivoted flap, said nozzles being further disposed in contiguous relation to one another along the length of said flap, means for conducting gases under pressure to said nozzles, and vanes carried by said pivoted flap and located in relatively fixed positions with respect to said nozzles to direct boundary layers of air along the surface of the airfoil under the inspirating action of gases being discharged from said nozzle.

6. An airfoil having a pivoted rear flap defining a series of propulsive nozzles opening at the trailing edge thereof and being of unchanged cross-section in all positions of said flap, said nozzles being further disposed in contiguous relation to one another along the length of said flap, said airfoil having a slot in a surface thereof in advance of the pivot point for said flap through which boundary air may be led into said airfoil and to said nozzles and means for supplying a fluid under pressure to said nozzles and thereby producing an aspirating effect on said boundary air and causing portions thereof to be drawn in through said slots and discharged through said nozzles in admixture with said fluid under pressure.

7. An airfoil having a pivoted rear flap defining a series of propulsive nozzles opening at the trailing edge thereof and being unchanged in cross-section in all positions of said flap, said nozzles being further disposed in contiguous relation to one another along the length of said flap, said airfoil having a slot in a surface thereof in advance of the pivot point for said flap through which boundary air may be led into said airfoil for discharge through said nozzles in all positions of said flap, said airfoil also having a second slot for intake of boundary air in its lower surface adjacent said flap and means for supplying a fluid under pressure to said nozzles and thereby producing an aspirating effect on said boundary air and causing portions thereof to be drawn in through said slots and discharged through said nozzles in admixture with said fluid under pressure.

8. In combination with an airfoil having a pivoted flap at the trailing edge thereof, rearwardly directed propulsive nozzles carried by and movable with the pivoted flap and being of unchanged cross-section in all positions of said flap, said nozzles being further disposed in contiguous relation to one another along the length of said flap, and means associated with said airfoil for establishing an accelerated flow of boundary air along an exterior surface of said airfoil and for discharging same at said nozzles, said means including means for conducting a gas under pressure to and through said nozzles and thereby to exert an aspirating effect on said boundary air.

PIERRE ERNEST MERCIER.

REFERENCES CITED

The following references are of record in the file of this patent:

UNITED STATES PATENTS

| Number | Name | Date |
| --- | --- | --- |
| 1,032,699 | Payne | July 16, 1912 |
| 1,290,669 | Schmidt | Jan. 7, 1919 |
| 1,491,954 | Jacobs | Apr. 29, 1924 |
| 1,725,914 | Hallowell | Aug. 27, 1929 |
| 1,782,072 | McKinstry | Nov. 18, 1930 |
| 1,868,832 | Henter et al. | July 26, 1932 |
| 1,874,278 | Gaines | Aug. 30, 1932 |
| 1,879,717 | Sikorsky | Sept. 27, 1932 |
| 1,976,482 | Child | Oct. 9, 1934 |
| 1,979,298 | Trey et al. | Nov. 6, 1934 |
| 2,292,288 | Pescara | Aug. 4, 1942 |

FOREIGN PATENTS

| Number | Country | Date |
| --- | --- | --- |
| 341,602 | Great Britain | Jan. 22, 1931 |
| 390,363 | Great Britain | Apr. 6, 1933 |
| 851,718 | France | Oct. 9, 1939 |